United States Patent [19]

Cohen

[11] Patent Number: 5,442,577
[45] Date of Patent: Aug. 15, 1995

[54] SIGN-EXTENSION OF IMMEDIATE CONSTANTS IN AN ALU

[75] Inventor: Earl T. Cohen, Fremont, Calif.

[73] Assignee: Exponential Technology, Inc., San Jose, Calif.

[21] Appl. No.: 207,751

[22] Filed: Mar. 8, 1994

[51] Int. Cl.⁶ .............................................. G06F 7/38
[52] U.S. Cl. ...................................... 364/716; 326/37
[58] Field of Search ........................... 364/716; 326/37

[56] References Cited

U.S. PATENT DOCUMENTS

| 4,460,970 | 7/1984 | McClary | 364/761 |
| 4,608,660 | 8/1986 | Hasbe | 364/768 |
| 4,748,582 | 5/1988 | New et al. | 364/754 |
| 4,761,756 | 8/1988 | Lee et al. | 364/757 |
| 4,831,573 | 5/1989 | Norman | 364/716 |
| 4,860,235 | 8/1989 | Kondou et al. | 364/716 |
| 5,195,051 | 3/1993 | Palaniswami | 364/748 |
| 5,227,989 | 7/1993 | Jones, Jr. et al. | 364/716 |
| 5,251,167 | 10/1993 | Simmonds et al. | 364/760 |
| 5,327,364 | 7/1994 | Jones, Jr. et al. | 364/716 |

*Primary Examiner*—David H. Malzahn
*Attorney, Agent, or Firm*—Stuart T. Auvinen

[57] ABSTRACT

An arithmetic-logic unit (ALU) includes a Boolean logic unit and an integer logic unit, both of which are adapted to incorporate the sign extension function for immediate constants or reduced-width operands. The Boolean logic unit is constructed from 4:1 multiplexers (muxes), one mux for every bit in a full-width operand. The operands or constants are input to the select inputs for the muxes while signals representing the truth table for a predetermined Boolean operation are inputted to the four data inputs of each of the muxes. This allows for many different kinds of Boolean operations to be executed by the Boolean logic unit; each type of Boolean operation called for by an instruction opcode will have a corresponding set of truth table signals for input to the muxes. Sign-extension can be combined with the Boolean operation by using the sign bit of the reduced-width operand to select one of two modified sets of truth-table signals. The selected set of truth-table signals is applied to the data inputs of the muxes. An upper section of the truth-table sets has the sign bit of the reduced width operand encoded into the truth-table sets themselves. The integer arithmetic unit uses exclusive-OR gates, controlled by the sign bit, to selectively invert the reduced width operand. The output, which is always a positive number, is extended with zeros, then selectively inverted again before being added to a second operand in an adder. Addition or subtraction incorporating the sign-extension of one operand is thus possible with the modified integer arithmetic unit.

13 Claims, 3 Drawing Sheets

SIGN-EXTENSION OF IMMEDIATE CONSTANTS IN AN ALU

BACKGROUND OF THE INVENTION—FIELD OF THE INVENTION

This invention relates to digital arithmetic units, and more particularly to methods for sign-extension of constants.

BACKGROUND OF THE INVENTION—DESCRIPTION OF THE RELATED ART

Computers performing arithmetic operations on operands are well-known. Operands that are constant and not variable may be supplied to the computer inside the instruction word itself. Since the instruction word is usually of limited length, the constant inside the instruction word is also limited in size. Typically only an 8-bit byte or a 16-bit half-word is supplied as an immediate constant in the instruction word, while the computer is capable of processing 32-bit data operands. Thus the immediate byte or half-word must be extended to the full 32-bit size of the other operands.

Operands and constants are often represented as binary numbers in two's complement format. Two's complement is widely used because any two numbers may be added together or subtracted in a simple adder. Positive numbers are represented simply as the number itself converted to a binary number. However, the magnitude of numbers that may be represented by a particular number of binary bits is reduced so that the uppermost, or most-significant bit, may be used to indicate the sign of the number. This sign bit is typically a "0+ for positive numbers and a "1" for negative numbers. Any two positive numbers may be added together, provided the sum is not greater than the largest representable positive number for the particular number of bits. If the sum is too large, then an overflow has occurred and the result is not valid.

A negative number may be generated from a positive number by a 2-step process. First the number is inverted to get the one's complement; each bit in the binary number is inverted. Thus the sign bit will be inverted from a "0" to a "1", indicating a negative number. Second, a "1" is added to the one's complement of the number to get the two's complement result. This addition may require an extra adder, or preferably the carry-in of the main adder in the ALU may simply be set to a "1" to accomplish the second step. Thus the one's complement of the number is inputted to the ALU together with a second operand, and the carry-in bit of the ALU adds "1" to the result.

When a signed 8-bit constant is added to a 32-bit operand, the constant must normally be sign-extended to 32-bits. The most-significant bit (MSB) of the constant is taken to be its sign bit. This MSB is copied to all 24 extended bit positions to make a 32-bit sign-extended constant. The new sign bit is the new MSB, or the 32nd bit. Thus a positive 8-bit constant will have all zeros in bits 31 to 8, while a negative 8-bit constant will have all ones from bits 31 to 8, and in bit 7, the MSB of the 8-bit constant. A 16-bit constant, or any other size constant may similarly be sign-extended to any larger size.

Often an explicit instruction is used to sign-extend a constant. This may require an additional processor clock. An operand may be sign-extended when being loaded from memory into the Central Processing Unit's (CPU's) registers. However, if the constant is immediate, present in the instruction word itself, then there may not be time to first load this constant into the register file before being inputted into the arithmetic-logic-unit (ALU) for execution. Sign-extension has to be explicitly controlled by the instruction or the ALU may have to be modified to handle sign-extension.

What is desired is a method to sign-extend immediate constants in instruction words without having to explicitly perform a sign-extension operation or instruction. The method must be high-speed but not burden the programmer down with explicit sign-extension.

SUMMARY OF THE INVENTION

Sign-extension is combined with a Boolean operation in a truth-table. Accordingly a signed binary operand does not have to be explicitly sign-extended in a separate sign-extend unit as required by the prior art. The sign bit for the signed binary operand selects between a first set and a second set of truth table signals for output by a plurality of multiplexer cells. Each set of truth-table signals contains a composite operation that includes the Boolean operation with an implicit sign-extension of the signed binary operand.

A Boolean logic unit includes a series of n multiplexer cells, each cell having an output, data inputs, and two select inputs which select one of the data inputs for assignment to the output of the multiplexer cell. A first input bus has m binary signals representing a first binary operand which is m binary bits in size, where m is less than n, the first input bus being coupled to the first select input. The first input bus has a sign bit for the first binary operand, with the sign bit indicating if the first binary operand is a positive binary number or a negative binary number.

A second input bus has n binary signals representing a second binary operand which is n binary bits in size. The second input bus is coupled to the second select input. Truth-table signals are coupled to the data inputs. These truth-table signals represent the outputs of the particular Boolean logic operation indicated by the instruction opcode, which may be one of many Boolean logic operations, each operation having a corresponding set of truth-table signals. The truth table signals include a first set applied to the data inputs if the sign bit indicates a positive binary number, and a second set applied to the data inputs if the sign bit indicates a negative binary number. The sign bit for the first binary operand thus selects be[tween a first set and a second set of truth table signals for output by the plurality of multiplexer cells, allowing sign-extension to be combined with the Boolean operation in the truth-table. Accordingly the first binary operand does not have to be sign-extended as required by the prior art.

In another aspect of the invention, both addition and subtraction can be performed on operands using zero-extension instead of explicit sign extension as required in the prior art. An integer arithmetic unit for adding and subtracting binary numbers represented in two's complement form includes a first operand input represented by binary signals as a binary number in two's complement form, the first operand having a sign bit for indicating if the first operand is a positive or a negative binary number. A first inversion control input is for enabling inversion of each binary signal representing the first operand. The first inversion control input receives the sign bit for the first operand. A first inverting means, responsive to the first inversion control input, is for selectively inverting each binary signal representing the first operand. Extension means receives the selectively inverted output from the first inverting means, and extends the output with binary signals representing zero. The extension means produces an extended first operand representing a positive number.

A second inversion control input controls a second inverting means for selectively inverting the extended first operand. A second operand is inputted to an adder, which is also coupled to the output of the second inverting means. The adder calculates the sum of the second operand and the output of the second inverting means. The adder also has a single-bit carry-in input for increasing the sum by one. Thus both addition and subtraction can be performed on operands using zero-extension instead of explicit sign extension as required in the prior art.

DETAILED DESCRIPTION

An arithmetic-logic-unit (ALU) includes both an adder and a Boolean logic unit. The adder is used to add numbers together that are represented as binary integers. If two's complement format is used, then subtraction may be performed by adding the negative or two's complement of the numbers. Multiplication may be simulated in the ALU by repeated addition and shifting. The Boolean logic unit can perform a variety of logical operations on operands and constants, such as negation, bit-by-bit inversion, bit-wise ANDing, ORing, exclusive-ORing and other logical operations.

BOOLEAN LOGIC UNIT

Figure 1:
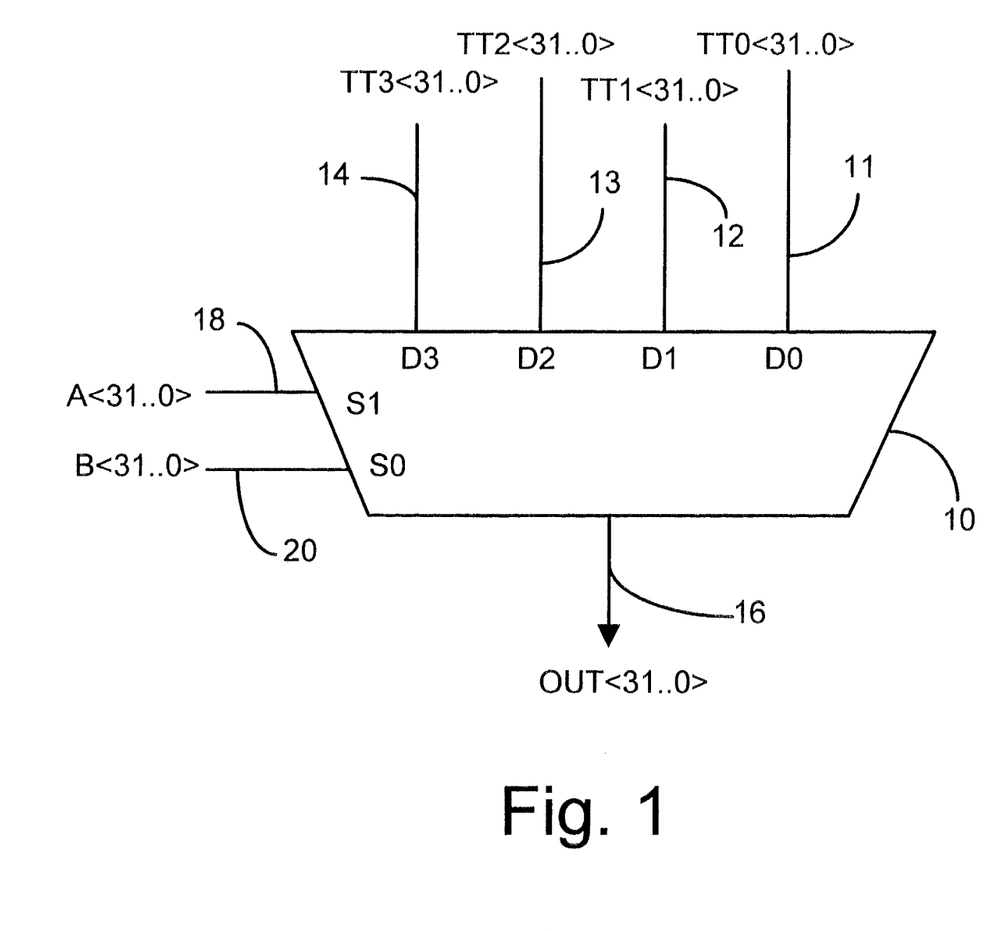
FIG. 1 is a diagram of a vectored mux in a Boolean logic unit.

The Boolean logic unit is implemented as a vectored multiplexer or mux. FIG. 1 is a diagram of the Boolean logic unit. Vectored mux 10 comprises a 4:1 mux for each bit position of the operand word. Thus for 32-bit operands, 32 individual 4:1 mux cells are combined to form vectored mux 10. Two operands or an operand and a constant are applied to the select inputs S 1, S0 of the mux 10. Operand A<31:0>18 is applied to select inputs S1, the more significant select input, while a second operand or a constant B<31:0>20 is applied to select inputs S0. The data inputs D0, D1, D2, D3 of vectored mux 10 are supplied with electrical truth-table signals 11, 12, 13, 14 that represent a Boolean truth table. Truth table signals 11–14 may be supplied by a small read-only memory (ROM), such as a portion of a microcode ROM, or these signals 11–14 may be generated by combinatorial logic that take as inputs the operation or opcode of an instruction word. A different set of truth table signals 11–14 are selected to be applied to the data inputs, depending upon the type of operation designated by the instruction opcode. The output 16 of the mux 10 is also a 32-bit binary number represented by electrical signals. A binary "1" is typically represented by a high voltage, such as 5 or 3.3 volts, while a binary "0" is typically represented by a low voltage, such as 0 volts or ground.

Each binary bit of operand A<31:0>18 and operand or constant B<31:0>20 are connected to a different 4:1 mux cell in vectored mux 10. Likewise each truth table signal 11–14 is connected to a different mux cell in vectored mux 10. Each mux cell drives one binary bit of the output <31:0>16. Thus the most significant mux cell, designated 31, is connected as follows:

S1 = A<31>     S0 = B<31>
D3 = TTS3<31>  D2 = TTS2<31>
D1 = TTS1<31>  D0 = TTS0<31>
Out = Output<31>

Likewise the least-significant mux cell, designated by the number 0, would be connected to bits <0> of each of these signals, while intermediate bits are connected to intermediate mux cells, for example all bits <24> connect to mux cell designated by the number 24. Each mux cell performs the logic function shown in Table 1, where one of the four inputs is selected to be coupled, transferred or assigned to the output.

TABLE 1

| Mux Cell Logic Function | | | |
|---|---|---|---|
| Input A (S1) | Input B (S0) | Output Selected | Value |
| 0 | 0 | D0 | TT0 |
| 0 | 1 | D1 | TT1 |
| 1 | 0 | D2 | TT2 |
| 1 | 1 | D3 | TT3 |

This peculiar connection of the truth table signals 11–14 to the data inputs of vectored mux 10 while the data operand values are connected to the control or select inputs allows for encoding of any binary operation or function of 2 variables, such as AND, OR, NOR, NAND, exclusive-OR (XOR), exclusive-NOR, invert, and other combinations of inputs A and B such as 'A AND NOT B', or 'NOT A AND B'. Thus the Boolean logic unit is versatile and comprehensive. For example, the AND of two 32-bit operands A and B could be encoded:

TT0<31:0> = 0x00000000
TT1<31:0> = 0x00000000
TT2<31:0> = 0x00000000
TT3<31:0> = 0xFFFFFFFF where the encoding is shown in hexadecimal, each "0" digit after the "0x" represents four "0" bits, and each "F" digit representing four "1" bits. A "1" is a high logic value, typically represented in a digital computer system as signal with a high voltage, such as 5 or 3.3 volts, while a "0" is a logic low value, typically represented by a low voltage such as 0 volts or ground. Of course, the logic values could be reversed for an inverse-logic system that employs active-low signals. For 32-bit operands, each of TT3, TT2, TT1, and TT0 is a 32-bit vector that is self-identical, having the same logic value in each bit position. This is a consequence of performing the same logic function on each bit. Thus it is simple to generate the TT3-TT0 32-bit vectors because these vectors are simply the truth table for the single-bit logic function, but copied to 32-bits.

The logical AND function outputs a "1" only when both select inputs are "1". As table 1 shows, D3 is selected when both of the select inputs S0 and S1 are high. TT3, which drives all the D3 inputs, is a 'one' in each bit position in the above example. To provide the AND function, the D3 input to each mux cell must be high. Thus in this embodiment, when both inputs are "1" in a particular bit position, then D3 is selected and TT3, which is "1", is muxed to the output.

Other logic function may also be encoded into vectors TT0-TT3. An OR function outputs a high bit when either operand bit is high. Table 2 shows that a single-bit OR function outputs a "1" when either input A or B (S1 or S0) is "1". Since the same logic function is applied to all bits in the 32-bit input operands, the TT values applied to the data inputs are merely the truth table for the OR function extended to 32-bits.

TABLE 2

| Mux Cell OR Function | | | | | |
|---|---|---|---|---|---|
| Input A (S1) | Input B (S0) | Output Selected | Vector | OR | TT Value |
| 0 | 0 | D0 | TT0 | 0 | 0x00000000 |
| 0 | 1 | D1 | TT1 | 1 | 0xFFFFFFFF |
| 1 | 0 | D2 | TT2 | 1 | 0xFFFFFFFF |
| 1 | 1 | D3 | TT3 | 1 | 0xFFFFFFFF |

Other functions such as exclusive-OR (XOR) and unusual functions such as 'A AND NOT B' ($A\overline{B}$) may also be implemented as shown in Tables 3 and 4.

TABLE 3

| Mux Cell XOR Function | | | | | |
|---|---|---|---|---|---|
| Input A (S1) | Input B (S0) | Output Selected | Vector | XOR | TT Value |
| 0 | 0 | D0 | TT0 | 0 | 0x00000000 |
| 0 | 1 | D1 | TT1 | 1 | 0xFFFFFFFF |
| 1 | 0 | D2 | TT2 | 1 | 0xFFFFFFFF |
| 1 | 1 | D3 | TT3 | 0 | 0x00000000 |

TABLE 4

| Mux Cell ($A\overline{B}$) Function | | | | | |
|---|---|---|---|---|---|
| Input A (S1) | Input B (S0) | Output Selected | Vector | ($A\overline{B}$) | TT Value |
| 0 | 0 | D0 | TT0 | 0 | 0x00000000 |
| 0 | 1 | D1 | TT1 | 0 | 0x00000000 |
| 1 | 0 | D2 | TT2 | 1 | 0xFFFFFFFF |
| 1 | 1 | D3 | TT3 | 0 | 0x00000000 |

A different set of four truth-table signals is chosen for application to the data inputs of the muxes depending upon the Boolean logic operation designated by the instruction opcode. Any Boolean logic function may be implemented with the invention by extending the single-bit truth table to all 32-bits of the truth-table signals when full-sized 32-bit operands are inputted to the Boolean logic unit. However, smaller constants must normally be sign-extended. This can be accomplished with a modification to the Boolean truth table vectors TT0-TT3 using the same apparatus of FIG. 1.

SIGNED CONSTANTS IN THE BOOLEAN LOGIC UNIT

Constants such as immediate constants from the instruction word could be sign-extended by a separate sign-extend unit and then inputted into the Boolean logic unit as described above. However, a separate sign-extend unit and the added delay incurred may advantageously be avoided by encoding the effect of sign-extend operation into the truth table signals that are inputted to the data inputs of the vectored mux. Thus the Boolean Logic Unit can perform a single, atomic operation that includes both the Boolean logic operation and the effect of the sign-extend operation. A composite operation includes both the Boolean operation with an implicit sign-extension of a signed binary operand.

Truth table vectors TT0-TT3 are modified to account for sign-extension by dividing each vector into two sections, an upper section and a lower section. When no sign-extension is required, as when only 32-bit operands are being used, then both sections of any particular vector TT0-TT3 contain identical values, either all ones or all zeros in all bit positions. However, when sign-extension is required, then the 2 sections in any vector may differ, but each section will still contain either all ones or all zeros.

The size of the lower section is identical to the size of the constant that would be sign-extended in the prior art. This lower section is encoded as shown and described before in Tables 2-4, except that the size of the lower section may be less than the full 32 bits. The size of the lower section will match the size of the constant. If the constant is 8-bits wide, then the lower section is only 8-bits wide.

The upper section occupies the rest of the 32-bit width. The truth-table vectors are modified in the upper section to incorporate the function of sign-extension of the constant. The MSB of the constant is the sign bit and corresponds to the MSB of the lower section. This sign bit would be copied or extended over the upper section in a prior-art sign-extend operation. The output for the upper section depends only upon the operand bits in each position for the A operand, and the MSB of the constant B, which is the MSB in the lower section. The output for the upper section does not depend on any of the constant B bits for the upper section because constant B is not defined for the upper section before a prior-art sign-extension has occurred. Because the invention disregards any bits in the upper section for constant B, constant B may be zero-extended before input to the Boolean Logic Unit, even if constant B is not a positive number but a negative number. This simplifies the data path logic, because all constants may be zero-extended, regardless of their actual sign. Since the arithmetic unit also employs zero extension, both Boolean and Arithmetic data paths are symmetric and may thus be simplified.

Thus the output 16 of the vectored mux 10 of FIG. 1 will be split into two portions, an upper section and a lower section. The lower section, which corresponds to the width of the constant, is dependent upon both the constant and the full-width operand. The output 16 for each bit in the lower section is simply the result of the desired logic function applied to each individual lilt position. However, since the constant is not defined for the upper section, the output 16 will not depend on any bits in the upper section for constant B. The upper section output will only depend upon the sign bit of the constant, which is in the lower section, and upon the operand A bits in the upper section. Thus the upper bits for select input 20, for the constant B, can be in any logic state because these inputs will be ignored.

For the AND operation, if input B is a byte-wide constant, then Table 5 shows the encoding for the AND accounting for the sign-extension operation. The truth table vectors TT0-TT3 are re-named TTS0-TTS3 to emphasize that sign extension is also occurring with the logic operation and the encoding for TTS0-TTS3 differs from the encoding for TT0-TT3.

TABLE 5

Mux Cell AND Function with Byte Sign-Extend

| MSB of Constant | Input A (S1) | Input B (S0) | Output Selected | Vector | AND | TTS Value |
| --- | --- | --- | --- | --- | --- | --- |
| 0 | 0 | 0 | D0 | TTS0 | 0 | 0x000000_00 |
| 0 | 0 | 1 | D1 | TTS1 | 0 | 0x000000_00 |
| 0 | 1 | 0 | D2 | TTS2 | 0 | 0x000000_00 |
| 0 | 1 | 1 | D3 | TTS3 | 1 | 0x000000_FF |
| 1 | 0 | 0 | D0 | TTS0 | 0 | 0x000000_00 |
| 1 | 0 | 1 | D1 | TTS1 | 0 | 0x000000_00 |
| 1 | 1 | 0 | D2 | TTS2 | 0 | 0xFFFFFF_00 |
| 1 | 1 | 1 | D3 | TTS3 | 1 | 0xFFFFFF_FF |

In Table 5 the upper and lower sections of vectors TTS0-TTS3 are separated by an underscore character (" "). The lower section does not globally depend upon the MSB, or sign bit, of the constant, as seen by identical lower sections for MSB=0 or MSB=1 in Table 5. The upper section does not depend upon the bit-values of the constant B input (S1), since the constant B is not defined for the upper section. The upper section does depend upon the sign bit of the constant, the MSB of the constant in the lower section. For the AND function, the upper section output can only be "1" when both the operand A input and the MSB sign bit of constant B are "1". The last two rows of Table 5 have identical TTS values for the upper section because these rows differ only in the Constant B input (S0), which does not affect the upper section.

The truth-table vectors TTS0-TTS3 will differ, depending upon the value of the constant's MSB sign bit. Thus one set of vectors must be inputted to the vectored mux if the MSB is "0", while a second set must be inputted if the MSB is "1", as the table shows. However, the truth-table vectors differ from the previously described implementations only in the upper section, not in the lower section.

Other functions that account for sign-extension may also be implemented with modification of the TTS0-TTS3 vectors. Table 6 shows the OR function incorporating sign-extension, which likewise has the lower section of the TTS0-TTS3 vectors (after the underscore character) identical to the bit-wise OR function previously shown in Table 2. The upper section is the result from an OR of the constant's MSB sign bit with each bit in the upper section of operand input A. For negative constants, which have a "1" for the sign bit, the output of the upper section is always "1", regardless of the value of input A. The logic theorem "1 OR x=1" is used, since the output must be "1" regardless of the value of x when one input is "1".

TABLE 6

Mux Cell OR Function with Byte Sign-Extend

| MSB of Constant | Input A (S1) | Input B (S0) | Output Selected | Vector | OR | TTS Value |
| --- | --- | --- | --- | --- | --- | --- |
| 0 | 0 | 0 | D0 | TTS0 | 0 | 0x000000_00 |
| 0 | 0 | 1 | D1 | TTS1 | 1 | 0x000000_FF |
| 0 | 1 | 0 | D2 | TTS2 | 1 | 0xFFFFFF_FF |
| 0 | 1 | 1 | D3 | TTS3 | 1 | 0xFFFFFF_FF |
| 1 | 0 | 0 | D0 | TTS0 | 0 | 0xFFFFFF_00 |
| 1 | 0 | 1 | D1 | TTS1 | 1 | 0xFFFFFF_FF |
| 1 | 1 | 0 | D2 | TTS2 | 1 | 0xFFFFFF_FF |
| 1 | 1 | 1 | D3 | TTS3 | 1 | 0xFFFFFF_FF |

Table 6: Mux Cell OR Function with Byte Sign-Extend

TABLE 7

Mux Cell XOR Function with Byte Sign-Extend

| MSB of Constant | Input A (S1) | Input B (S0) | Output Selected | Vector | XOR | TTS Value |
| --- | --- | --- | --- | --- | --- | --- |
| 0 | 0 | 0 | D0 | TTS0 | 0 | 0x000000_00 |
| 0 | 0 | 1 | D1 | TTS1 | 1 | 0x000000_FF |
| 0 | 1 | 0 | D2 | TTS2 | 1 | 0xFFFFFF_FF |
| 0 | 1 | 1 | D3 | TTS3 | 0 | 0xFFFFFF_00 |
| 1 | 0 | 0 | D0 | TTS0 | 0 | 0xFFFFFF_00 |
| 1 | 0 | 1 | D1 | TTS1 | 1 | 0xFFFFFF_FF |
| 1 | 1 | 0 | D2 | TTS2 | 1 | 0x000000_FF |
| 1 | 1 | 1 | D3 | TTS3 | 0 | 0x000000_00 |

Table 7 shows the exclusive-OR function accounting for sign-extension of a byte constant B. The lower section is simply the XOR logic function extended to all bits in the lower section. The upper section output is "1" or "F", which represents in hexadecimal notation four "1" bits, when either the bit for input A is "1" or the MSB sign bit of the constant B is "1", but not when both are "1", as in rows 7 and 8.

Table 8 shows the encoding for the function A AND NOT B incorporating sign-extension. The upper section can be a "1" only when the input A bit is a "1" and the constant B's sign bit (MSB) is a "0".

TABLE 8

| | Mux Cell (A B̄) Function with Byte Sign-Extend | | | | | |
|---|---|---|---|---|---|---|
| MSB of Constant | Input A (S1) | Input B (S0) | Output Selected | Vector | A B̄ | TTS Value |
| 0 | 0 | 0 | D0 | TTS0 | 0 | 0x000000_00 |
| 0 | 0 | 1 | D1 | TTS1 | 0 | 0x000000_00 |
| 0 | 1 | 0 | D2 | TTS2 | 1 | 0xFFFFFF_FF |
| 0 | 1 | 1 | D3 | TTS3 | 0 | 0xFFFFFF_00 |
| 1 | 0 | 0 | D0 | TTS0 | 0 | 0x000000_00 |
| 1 | 0 | 1 | D1 | TTS1 | 0 | 0x000000_00 |
| 1 | 1 | 0 | D2 | TTS2 | 1 | 0x000000_FF |
| 1 | 1 | 1 | D3 | TTS3 | 0 | 0x000000_00 |

Finally, the truth-table encodings TTS0-TTS3 can be modified for the effect of sign-extending constants that are sizes other than 8-bits. Table 9 shows the A AND NOT B function of Table 8, but for a 16-bit constant B. Four hexadecimal digits represent the lower section which is 16 bits in this example.

TABLE 9

| | Mux Cell (A B̄) Function with 16-bit Sign-Extend | | | | | |
|---|---|---|---|---|---|---|
| MSB of Constant | Input A (S1) | Input B (S0) | Output Selected | Vector | A B̄ | TTS Value |
| 0 | 0 | 0 | D0 | TTS0 | 0 | 0x0000_0000 |
| 0 | 0 | 1 | D1 | TTS1 | 0 | 0x0000_0000 |
| 0 | 1 | 0 | D2 | TTS2 | 1 | 0xFFFF_FFFF |
| 0 | 1 | 1 | D3 | TTS3 | 0 | 0xFFFF_0000 |
| 1 | 0 | 0 | D0 | TTS0 | 0 | 0x0000_0000 |
| 1 | 0 | 1 | D1 | TTS1 | 0 | 0x0000_0000 |
| 1 | 1 | 0 | D2 | TTS2 | 1 | 0x0000_FFFF |
| 1 | 1 | 1 | D3 | TTS3 | 0 | 0x0000_0000 |

Thus the simple vectored mux hardware with the unusual connection of the data operand inputs to the mux control/select inputs, and the truth-table function vectors to the data inputs of the muxes, allows for a wide variety of logical functions. Moreover, sign-extension of one of the inputs may be encoded into the truth-table vectors so that sign-extension is accomplished at the same time as the Boolean function execution. The constant input may be zero-extended instead of being sign-extended as required in the prior art.

While each truth-table vector TT0-TT3 is 32-bits, these may be collapsed to only 2 bits for each function-/extension operation since all the bits in the upper section are identical, and all the bits in the lower section are identical. Thus a 32-bit×4 ROM is not required to store each set of truth-table vectors, but only 2 bits×4 vectors per set. In addition, each combination of the function, the constant size, and the sign bit requires that the 2 bits for four vectors be stored. Alternatively, the lower section result, "1" or "0", for the four vectors TT0-TT3 for each function could be generated from the instruction opcode. The constant width from the opcode could be used to fix the width of the lower section, while the sign bit of the constant would select between two possible sets of vectors for the function in the upper section.

While several examples have been shown for different logic functions of two variables, with and without accounting for the sign extension function, and for 8-bit and 16-bit constants, functions of one or three or more variables could be encoded, as could different operand and constant widths besides the examples shown.

INTEGER ARITHMETIC UNIT

Addition of two numbers represented in binary format is well-known using binary adders. The adder may be constructed in a variety of ways such as with carry-save adder cells chained together. A carry-in input to the least-significant bit position in the adder is often provided. An overflow or carry-out of the highest or most-significant bit position is also often provided.

Subtraction may be accomplished by adding the inverse or negative of a number. In binary representation the two's complement of a number behaves as the inverse of a number; when the two's complement of a number is added to the number, the result is zero. Therefore, a simple adder may be used for subtraction by adding the two's complement of a number.

The two's complement is generated by first inverting every bit in the binary number; this is known as the one's complement. This can be accomplished by an exclusive-ORing each bit with a "1". The two's complement results when this one's complement is added to the number "1".

Figure 2:
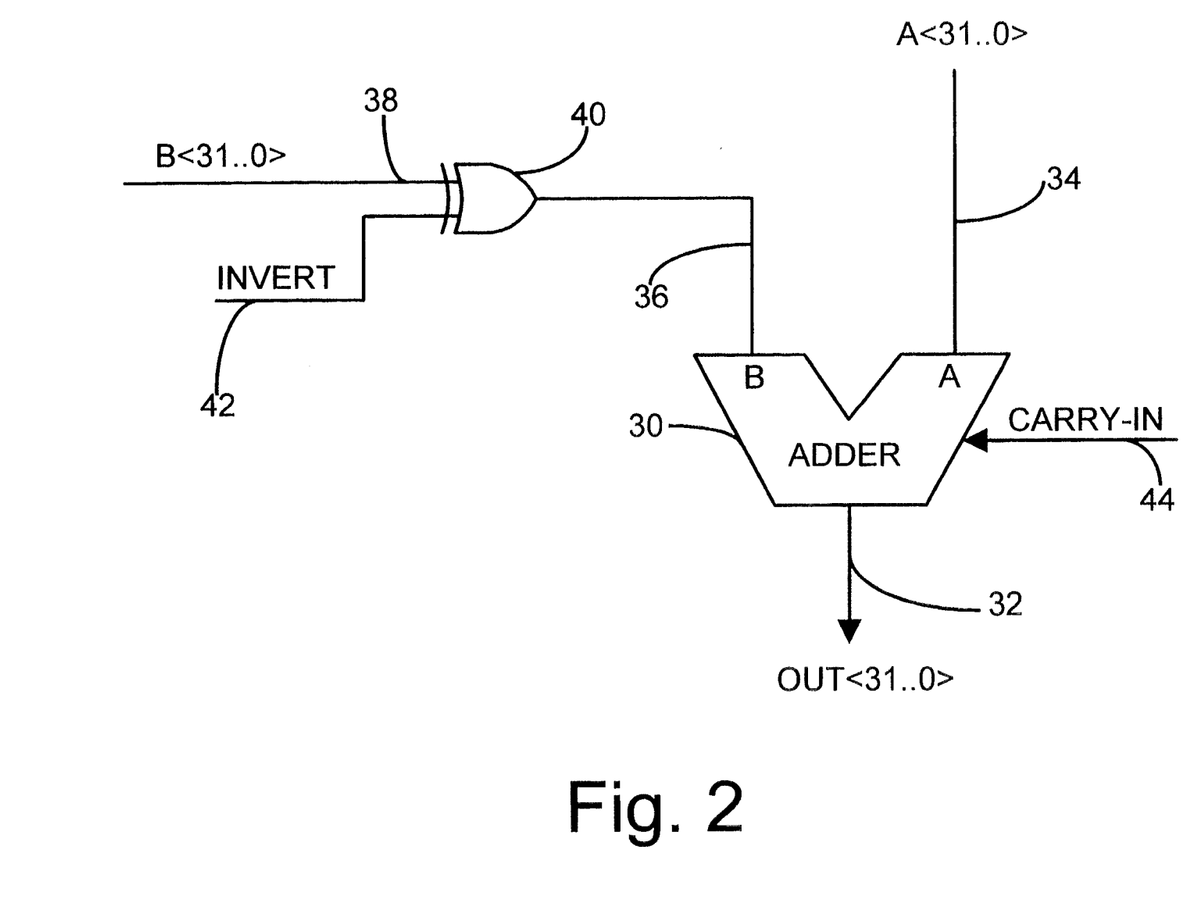
FIG. 2 is an adder and subtractor in an ALU.

The apparatus of FIG. 2 can perform both addition and subtraction of two binary numbers. Adder 30 produces a result which is output on bus 32. The adder 30 inputs A 34 and B 36 are both 32-bit binary numbers represented in a standard fashion by electrical signals of differing voltages. Adder 30 input B 36 may first be inverted by exclusive-OR gates 40, which contains one XOR gate for each of the 32 bits in operand B. One input to these XOR gates 40 is operand B 38, which may be driven by a register file or a temporary register in the processor. Likewise operand A 34 may be driven by a register, either a general-purpose register storage file or a temporary register. Invert control signal 42 will selectively cause XOR gates 40 to invert each bit of operand B 38 if invert control signal 42 is in the "1" state, or pass operand B 38 if invert control signal 42 is in the "0" state. XOR gates 40 thus selectively carry out a bit-wise inversion on one operand before inputting to the adder 30. The binary number on bus 36 is thus the one's complement of operand B 38 if the invert control signal 42 is high.

Although the one's complement is generated for operand B 38, the two's complement of operand B 38 is effectively added to operand A 34 because a "1" is also added to the two operand inputs 34, 36 within adder 30.

This "1", which is essentially a third input to the adder 30, is supplied as the carry-in input 44. Thus to subtract operand B 38 the adder 30 performs the operation $A+\bar{B}+1$, where $\bar{B}$ is the bit-wise inverse or one's complement of operand B 38, and the "1" is supplied by the carry-in input 44 to the adder 30.

Table 10 shows the control settings for invert control signal 42 and carry-in input 44 for accomplishing addition and subtraction of operands A 34 and B 38. The second and third operations are less commonly used.

TABLE 10

| Adder Operation without sign-extend | | |
|---|---|---|
| Invert Control | Carry-In Value | Operation Performed |
| 0 | 0 | A + B |
| 0 | 1 | A + B + 1 |
| 1 | 0 | A − B − 1 |
| 1 | 1 | A − B |

SIGNED CONSTANTS IN INTEGER ARITHMETIC UNIT

The apparatus of FIG. 2 may be modified to incorporate the sign-extension function for a constant or operand. Sign-extension could be performed separately from the addition or subtraction operation; however, benefits such as simpler hardware and faster operation result from blending the sign-extension operation in with the arithmetic operation, as was done in the Boolean logic unit.

Figure 3:
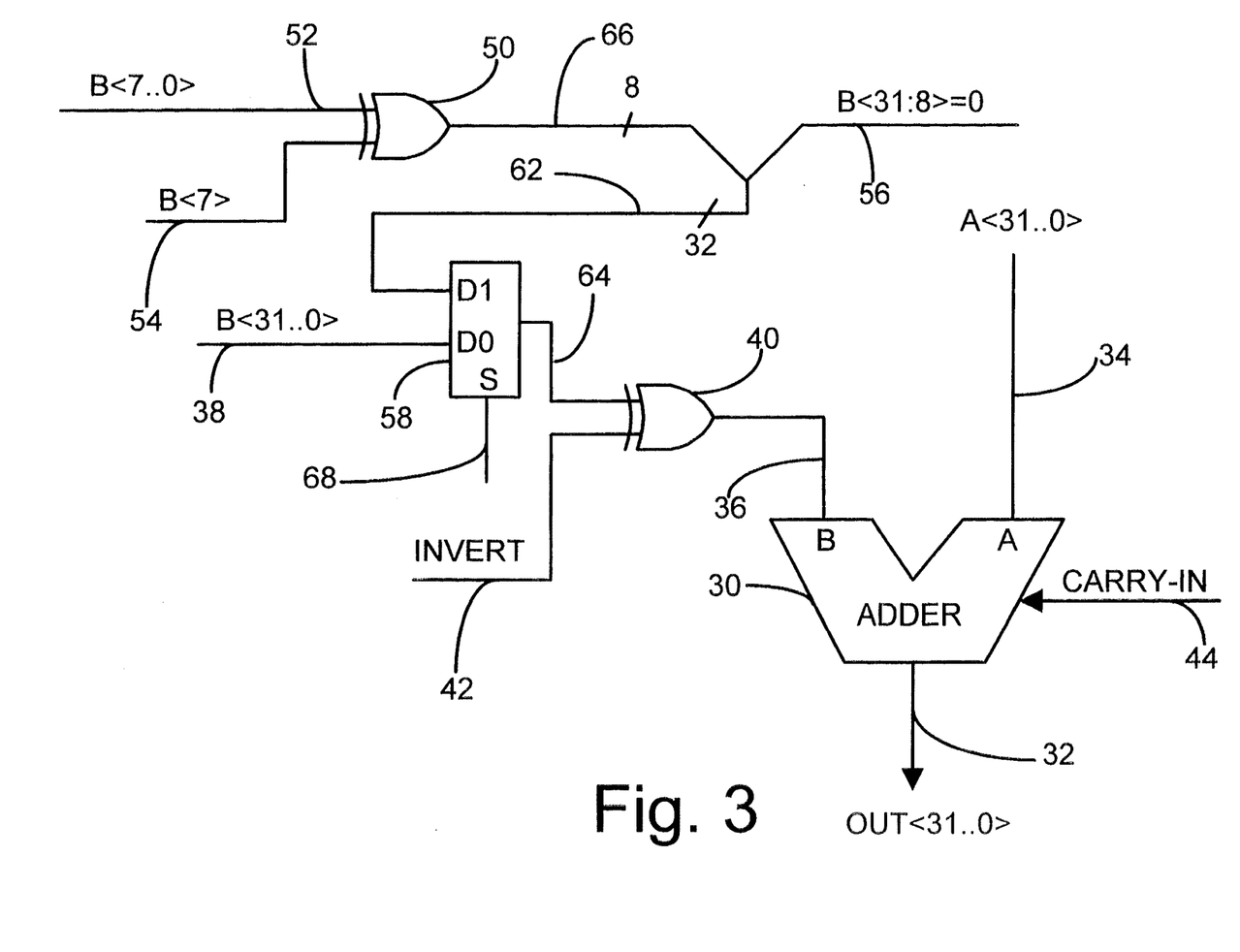
FIG. 3 is an adder and subtractor incorporating selective inversion and zero-extension of one operand.

FIG. 3 shows the apparatus for arithmetic operations with the sign extension function accounted for. As in FIG. 2, an adder 30 outputs its result on bus 32, and is provided with two inputs 34, 36, and a carry-in input 44. Both of inputs 34, 36 are 32-bits wide in the preferred embodiment, although in the future 64-bit systems will become commonplace. The B operand 38 may be inverted as described in reference to FIG. 2 by an inverting means constructed from exclusive-OR (XOR) gates 40. An inverting control signal 42 causes XOR gates 40 to selectively invert all 32 bits in operand B when the inverting control signal 42 is a logic high value. When inverting control signal 42 is low then operand B on bus 64 is passed through XOR gates 40 without inversion. Multiplexer or mux 58 selects the 32-bit B operand 38 if the select input 68 is zero. Mux 58 may be constructed from 32 individual 2:1 mux cells. Select input 68 is high when an operand or constant would normally require sign-extension, but low when a full-width operand or constant, in this embodiment 32 bits, is to be used. Select input 68 is preferably generated by the instruction decode unit, and reflects the operand size determined by the particular instruction being processed. When select input 68 is high, the 32-bit operand is selected from bus 62. However, as will be explained later, the operand on bus 62 is always a positive binary number, because zero-extension of the operand suffices with the apparatus of the present invention. Thus the value on bus 62 is the zero-extended operand B.

An 8-bit byte operand or constant B<7:0> 52 is inputted to a second inverting means, which is preferably eight XOR gates 50. The sign bit of the byte constant 52 is the most-significant bit (MSB), or B<7>, which is used to control inversion by the XOR gates 50. Thus if the constant B is a negative number, having the sign bit a "1", then the MSB on line 54 will cause XOR gates 50 to invert all 8 bits of constant B<7:0>. However, if the constant B is a positive number, the sign bit will be a "0", and the MSB on line 54 will cause XOR gates 50 to pass constant B<7:0> without inversion. Thus the output 66 of XOR gates 50 will always be a positive number, either the original positive constant B 52, or the one's complement of the negative constant B.

Output 66 is always zero-extended to produce adder 30 input B 36, greatly simplifying the hardware required because zeros are always concatenated with the positive constant on bus 66. Concatenation of the zeros for the upper twenty-four bits of the constant is accomplished by connecting the upper 24 bits of bus 62 to twenty-four lines 56 tied to logic zero. Thus a positive 8-bit constant 66 is zero-extended to 32 bits on bus 62, which is then inputted to mux 58.

Since the B constant 52 is always converted to a positive number and then zero-extended, the operation of the adder 30 and the inverting XOR gates 40 needs to be modified to take into account the possible one's complement inverting operation performed by XOR gates 50. If constant B is a positive number, then addition and subtraction is straightforward. Addition requires that XOR gates 40 do not invert the B constant on bus 64, and that no carry-in 44 is added. Subtraction is likewise as described for FIG. 2, with the invert control 42 high, inverting the constant with XOR gates 40 and adding an additional "1" in adder 30 by asserting the carry-in input 44.

However, if B constant 52 is a negative number, then its sign bit will signal over line 54 for XOR gates 50 to invert the B constant 52. This is a one's complement operation. Zero-extending the resulting positive constant on bus 66 has no effect on the computation. However, the one's complement operation must be accounted for in subsequent computation by the adder 30 and the inverting XOR gates 40. This can be blended into the complementing operation of XOR gates 40 by performing the opposite operation that would otherwise be performed. Thus for addition, XOR gates 40 would normally not invert, but when B constant 52 is negative inverting control signal 42 will be modified to be high, causing a second inverting one's complement to account for the first inverting one's complement by XOR gates 50. Thus the two inversions cancel each other out, and the addition can occur in adder 30.

Subtraction with a negative B constant 52 likewise requires that the inverting control signal 42 be reversed to account for the earlier inversion by XOR gates 50. For subtraction, XOR gates 40 would normally invert, but instead the inversion already occurred in XOR gates 50. Therefore, inverting control signal 42 is reversed to zero so that XOR gates 40 do not invert. The carry-in input 44 must still be high to add the additional "1" in adder 30 so that the one's complement of B may have the affect that the two's complement of B constant 52 would have. The carry-in input 44 is not modified; only the inverting control control signal 42 is modified.

TABLE 11

| Adder Operation Incorporating the Sign-Extension Function | | | |
|---|---|---|---|
| Sign Bit of B | Invert Control | Carry-In Value | Operation Performed |
| 0 | 0 | 0 | A + B |
| 0 | 0 | 1 | A + B + 1 |
| 0 | 1 | 0 | A − B − 1 |
| 0 | 1 | 1 | A − B |
| 1 | 1 | 0 | A + B |
| 1 | 1 | 1 | A + B + 1 |
| 1 | 0 | 0 | A − B − 1 |

TABLE 11-continued

| Adder Operation Incorporating the Sign-Extension Function | | | |
|---|---|---|---|
| Sign Bit of B | Invert Control | Carry-In Value | Operation Performed |
| 1 | 0 | 1 | A − B |

Table 11 shows that the inverting control signal 42 is modified when the sign bit 54 of the B constant 52 is "1", representing a negative number. Because of the automatic inversion of the negative B constant 52 by XOR gates 50 before the zero-extension, the inverting control signal 42 must be reversed. Other operations besides the simple add and subtract, such as add with carry, A + B + 1, and subtract with borrow, A − B − 1, are also shown in Table 11.

The preferred embodiment uses exclusive-OR (XOR) gates, which may be constructed by several well-known techniques, such as with pass transistors or two levels of logic gates. Exclusive-NOR gates could also be utilized with minor modifications to the inverting control signals. The second inverting means, which is preferably eight XOR gates 50 of FIG. 3, may exist physically near or as a part of the ALU, or it may exist as part of the instruction decode logic or unit, simplifying the data paths for the ALU.

ALTERNATE EMBODIMENTS

While the invention has been described using a 32-bit operand and a smaller-width constant, other operand sizes such as 64-bit or 16-bit may be substituted by those skilled in the an while still falling within the spirit of the invention. The smaller-width constant can be 8 bits, 16 bits, or other sizes, and the constant can be an immediate value from an instruction word, or any other constant that has not been sign-extended. Although the description has described the invention as it relates to accounting for sign extension of smaller-width constants., it is also contemplated that the methods described herein will apply to sign-extension of smaller-width operands as well as constants.

A 4:1 mux was described for implementing the Boolean logic unit having two operand inputs. However, the Boolean logic unit can be adapted for operating on a single operand using a 2:1 mux with a single select or control input, or three operands using an 8:1 mux with three control inputs;, or to larger numbers of operands with larger muxes or combinations of smaller muxes combined to emulate larger muxes. For example, two 4:1 muxes could have their outputs feed into a 2:1 mux, thereby emulating an 8:1 mux. It is also possible that the lowest or highest bit-position will use a more complex logic block than a simple mux allowing more complex functions to be implemented.

While the invention has been described with an embodiment which zero-extends a constant, a person skilled in the art will recognize that another embodiment using one-extension is possible with minor modifications of the control signals described herein, yet still falls within the spirit of the invention.

The invention may save delay on critical paths for operands because explicit sign-extension is no longer required on the operands before the Boolean logic or arithmetic operation is performed. Instead, the less critical control paths are modified to account for the sign-extension in an implicit manner. By combining the sign-extend operation with the Boolean or arithmetic operation, significant delay can be reduced or avoided.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A composite logic unit for performing a plurality of Boolean logic operations on a first operand, the composite logic unit allowing for implicit sign-extension of the first operand while simultaneously performing a predetermined Boolean logic operation of the plurality of Boolean logic operations, the predetermined Boolean logic operation indicated by an instruction opcode, the composite logic unit comprising:

a plurality of multiplexer cells, each of the plurality of multiplexer cells having an output, a plurality of data inputs, and a first select input, the first select input selecting one of the plurality of data inputs for coupling to the output;

a first input bus having a plurality of binary signals representing the first operand, the first input bus coupled to each of the first select inputs in the plurality of multiplexer cells;

a sign bit for the first operand, the ..sign bit indicating if the first operand is a positive binary number or a negative binary number; and truth-table means, coupled to the plurality of data inputs, the truth-table means representing the outputs of a composite operation, the composite operation comprising the predetermined Boolean logic operation operating on the first operand after a sign-extension operation, whereby the composite logic unit simultaneously performs the implicit sign-extension of the first operand and the predetermined Boolean logic operation.

2. The composite logic unit of claim 1 wherein the truth table means comprises a first set of truth table signals and a second set of truth table signals, the first set of truth table signals applied to the plurality of data inputs if the sign bit indicates a positive binary number, the second set of truth table signals applied to the plurality of data inputs if the sign bit indicates a negative binary number, whereby the sign bit for the first operand selects between the first set and the second set of truth table signals representing the predetermined Boolean logic operation, the sign-extension operation being encoded into the first set and the second set of truth-table signals.

3. The composite logic unit of claim 2 wherein the plurality of binary signals representing the first operand comprises m binary signals, and the plurality of multiplexer cells comprises n multiplexer cells, and m is less than n.

4. The composite logic unit of claim 3 wherein the sign bit for the first operand is one of the m binary signals in the plurality of binary signals representing the first operand.

5. The composite logic unit of claim 3 wherein each cell in the plurality of multiplexer cells further comprises a second select input, the composite logic unit further comprising a second input bus having a plurality of binary signals representing a second operand, the second input bus coupled to the second select input of each cell in the plurality of multiplexer cells.

6. The composite logic unit of claim 5 wherein the plurality of binary signals representing the second operand comprises n binary signals.

7. The composite logic unit of claim 6 wherein the number of data inputs in each multiplexer cell is equal to the number of select inputs of each multiplexer cell raised to the power of two.

8. The composite logic unit of claim 6 wherein:

the plurality of multiplexer cells comprise two sections, a lower section of m multiplexer cells and an upper section of n-m multiplexer cells; the first set of truth table signals and the second set of truth table signals each comprise two sections, a lower section of m bits and an upper section of n-m bits; the lower section of m bits representing the outputs of the predetermined Boolean logic operation indicated by the instruction opcode;

the upper section of n-m bits representing the outputs of a compound operation, the compound operation comprising the predetermined Boolean logic operation indicated by the instruction opcode operating upon a sign-extended first operand;

the first set of truth-table signals applied to the plurality of data inputs if the sign bit indicates a positive binary number, the second set of truth table signals applied to the plurality of data inputs if the sign bit indicates a negative binary number;

the output of the lower section of m multiplexer cells coupled to one of the plurality of data inputs selected by both the first operand and the second operand;

the output of the upper section of n.-m multiplexer cells coupled to one of the plurality of data inputs selected by the second operand, the value of the output of the upper section of n-m multiplexer cells not dependent upon the first operand but dependent upon the sign bit for the first operand.

9. A Boolean logic unit for performing a composite operation on a first binary operand and a second binary operand, the composite operation having the same output as a predetermined Boolean operation operating upon a sign-extended first binary operand, the Boolean logic unit comprising:

n multiplexer cells, each multiplexer cell having an output, data inputs, a first select input and a second select input, the first select input and the second select input selecting one of the data inputs for assignment to the output of the multiplexer cell;

a first input having m binary signals representing the first binary operand which is m binary bits in size, where m is less than n, the m binary signals each individually coupled to the first select input of one of the first m multiplexer cells of the n multiplexer cells; the first input having a sign bit for the first binary operand, the sign bit indicating if the first binary operand is a positive binary number or a negative binary number;

a second input having n binary signals representing a second binary operand which is n binary bits in size, the n binary signals each individually coupled to the second select input of each of the n multiplexer cells; and truth-table means, coupled to the data inputs, the truth-table means representing the outputs of the predetermined Boolean logic operation indicated by an instruction opcode, the predetermined Boolean logic operation being one of a plurality of Boolean logic operations, each of the plurality of Boolean logic operations having corresponding sets of truth-table signals;

the corresponding sets of truth table signals having a first set applied to the data inputs if the sign bit indicates a positive binary number, and a second set applied to the data inputs if the sign bit indicates a negative binary number;

whereby the sign bit for the first binary operand selects between a first set and a second set of truth table signals for output by the plurality of multiplexer cells.

10. The Boolean logic unit of claim 9 wherein the number of data inputs in each multiplexer cell is equal to the number of select inputs in each multiplexer cell raised to the power of two.

11. The Boolean logic unit of claim 9 wherein each set of truth table signals comprise two sections, a lower section of m bits and an upper section of n-m bits; and wherein the n multiplexer cells comprise a lower section of m multiplexer cells and an upper section of n-m multiplexer cells;

the lower section of m bits representing the outputs of the predetermined Boolean logic operation indicated by the instruction opcode, copied to m bits representing the same logic value, the output of each multiplexer cell in the lower section of m multiplexer cells coupled to one of the data inputs selected by one of the binary signals in the first binary operand and one of the binary signals in the second binary operand;

the upper section of n-m bits representing the outputs of the predetermined Boolean logic operation indicated by the instruction opcode, the outputs being the result of the predetermined Boolean logic operation operating upon the sign bit for the first binary operand and the upper section of n-m bits of the second binary operand, the truth-table means in the upper section dependent upon the sign bit of the first binary operand and the second binary operand.

12. A Boolean logic unit comprising:

a first operand input having m bit-positions, all m bit-positions being in a lower section, one of the m bit-positions being a sign bit indicating if the first operand is a positive or a negative binary number;

a second operand input having n bit-positions, a least-significant m bit-positions being in a lower section and a most significant n-m bit-positions being in an upper section;

a plurality of n mux cells, each mux cell in a position i producing an output for bit-position i, each mux cell in a position i having a first select input coupled to bit-position i of the first operand input if i is not greater than m, each mux cell in a position i having a second select input coupled to bit-position i of the second operand input, each mux cell having four data inputs D0, D1, D2, D3, the first and second select inputs selecting one of the four data inputs for coupling to the output;

a plurality of sets of truth-table signals, an instruction opcode designating a group of sets for a predetermined Boolean operation designated by the instruction opcode, the sign bit of the first operand selecting a set within the group of sets, each set of truth-table signals comprising:

four vectors TTS0, TTS1, TTS2, TTS3, of truth-table signals, each vector having n binary bits, for each bit-position i, binary bit TTS0(i) is applied to data input D0 of the mux cell in bit-position i, binary bit TTSI(i) is applied to data input D1 of the mux cell in bit-position i, binary bit TTS2(i) is applied to data input D2 of the mux cell in bit-position i, and binary bit TTS3(i) is applied to data input D3 of the mux cell in bit-position i;

the least-significant m bits of each of the four vectors of truth-table signals comprising a lower section, each of the least-significant m bits of the lower section representing an identical logic value, the logic value being the output of the predetermined Boolean logic operation when the corresponding data input of the mux cell is selected by corresponding logic values applied to the first and second select inputs of the mux cells; and the most-significant n-m bits of each of the four vectors comprising an upper section, each of the most-significant n-m bits in the upper section of a vector representing an identical logic value, the logic value being the output of the predetermined Boolean operation when the corresponding data input of a mux cell is selected by the second operand applied to the second select inputs of the mux cells and the value of the sign bit of the first operand that selected the set from the group of sets, the upper sections of vectors TTS0 and TTS1 being identical, and the upper sections of vectors TTS2 and TTS3 being identical, the set of four vectors being independent in the upper sections of the first select input of the mux cells, whereby the output of the mux cells in the upper section is dependent upon upper section bit-positions of the second operand and the sign bit of the first operand.

13. The Boolean logic unit of claim 12 wherein the upper section and the lower section of each vector differ when m is not equal to n, but have identical logic values when m is equal to n.

* * * * *